United States Patent [19]

Barr

[11] Patent Number: 4,779,989

[45] Date of Patent: Oct. 25, 1988

[54] TRANSFER MIXER ASSEMBLY FOR USE WITH AN EXTRUDER SCREW OF A POLYMER EXTRUDER OR THE LIKE

[76] Inventor: Robert A. Barr, P.O. Box 4476, Virginia Beach, Va. 23454

[21] Appl. No.: 938,554

[22] Filed: Dec. 1, 1986

[51] Int. Cl.⁴ .............................. B01F 7/08; B29B 7/14
[52] U.S. Cl. ........................................ 366/90; 366/88; 366/322; 366/324; 425/207; 425/208
[58] Field of Search .................. 366/79, 80, 81, 88, 366/89, 90, 322, 323, 324, 318, 319, 321, 82; 425/207, 208, 209

[56] References Cited

U.S. PATENT DOCUMENTS

| | | | |
|---|---|---|---|
| 1,604,799 | 10/1926 | Barton | 425/208 |
| 2,607,077 | 8/1952 | Dulmage | 425/207 |
| 2,744,287 | 5/1956 | Parshall et al. | 366/323 |
| 3,006,029 | 10/1961 | Saxton | 366/90 |
| 3,325,865 | 6/1967 | Dunnington et al. | 366/89 |
| 3,827,841 | 8/1974 | Kawai et al. | 425/208 |
| 4,075,712 | 2/1978 | Geyer | 366/79 |
| 4,136,969 | 1/1979 | Meyer | 366/88 |
| 4,184,772 | 1/1980 | Meyer | 366/88 |
| 4,201,482 | 5/1980 | Imhauser et al. | 366/98 |
| 4,419,014 | 12/1983 | Gale | 366/99 |
| 4,479,884 | 10/1984 | Clarke et al. | 252/132 |
| 4,632,795 | 12/1986 | Huber et al. | 366/90 |
| 4,697,928 | 10/1987 | Csongor | 366/90 |

FOREIGN PATENT DOCUMENTS 1219376  3/1986  U.S.S.R. .............................. 366/79

Primary Examiner—Harvey C. Hornsby
Assistant Examiner—Joseph S. Machuga
Attorney, Agent, or Firm—Mason, Fenwick & Lawrence

[57] ABSTRACT

A mixer assembly for mixing fluid material in the bore of a barrel wherein the mixer assembly includes structure for mixing and pumping toward its outlet end the material fed thereto comprising a stator assembly fixed in the barrel having outer cylindrical surface portions conforming substantially to the surface of the bore and having a stator bore provided with a groove-interrupted inner surface, and a driven rotor member having a groove-interrupted outer surface confronting the inner stator surface. The inner stator surface and outer rotor surface each have continuous helical grooves cut therein along a helical path which changes in depth with length from a small minimum depth to a larger maximum depth but never disappearing and having a plurality of axially spaced circumferential grooves at planes perpendicular to the bore center axis subdividing such surfaces into axially spaced serially arranged mixer sections with portions of the helical grooves extending between the circumferential grooves defining each section.

30 Claims, 3 Drawing Sheets

TRANSFER MIXER ASSEMBLY FOR USE WITH AN EXTRUDER SCREW OF A POLYMER EXTRUDER OR THE LIKE

BACKGROUND AND OBJECTS OF THE INVENTION

The present invention relates in general to extrusion mixers for the extrusion of molten or fluid plastics, and more particularly to add on or retrofit transfer mixer assemblies of the cavity-transfer type for use in extrusion of polymers in conjunction with the extruder screw of a polymer extruder.

An example of a known cavity transfer type extruder mixer is that disclosed in British Patent Specification No. 930,339 and includes a hollow cylindrical stator member and a cylindrical rotor member which is rotatable within the stator. The facing cylindrical surfaces on the rotor and stator carry respective pluralities of rows of elongate, longitudinally extending grooves. The rows of grooves on each member extend peripherally around the member and are spaced apart axially, the rows on one member being axially offset from the rows on the other member whereby there is axial overlap of the grooves in adjacent rows on the stator and rotor. By virtue of this arrangement of overlapping closed cavities on the rotor and stator, material progressing through this mixer has to travel in a path which alternates between rotor and stator cavities. Where a cavity on one member happens to be opposite a land on the other member the material is subjected to simple shear so that it is cut in half before being displaced approximately at right angles to its original direction as it passes into the next cavity. Another known machine of this type is described in British Patent Specification No. 1,475,216.

It has been found that, whereas such mixers operate satisfactorily when constructed on a small, laboratory scale, when scaled up to a large production size machine the efficiency of the mixer falls, a size limitation being reached where either the product is unsuitable or the added length necessary makes engineering complexity uneconomic. This is because the output rate per screw revolution of an extruder increases in proportion to the cubed power of the screw diameter whereas the available mixer area increases by only the square of the screw diameter if the length to diameter ratio of the mixer is kept constant.

If one attempts to increase the mixing capacity by making the cavities deeper then there is a risk of polymer stagnation and degradation occurring in the corners of the cavities.

Another known type of cavity-transfer type extruder mixer is that disclosed in U.S. Pat. No. 4,419,014 to George M. Gale, which relates to an extruder mixer having facing cylindrical surfaces of a rotor and stator which carry respective parallel rows of hemispherical cavities, wherein the rows of recesses or cavities for each member of the rotor and stator combination are spaced apart axially so that the rows of one member are axially offset from the rows of the other member and there is axial overlap of the recesses in adjacent rows on the stator and rotor.

An object of the present invention is the provision of a fluid mixer, primarily for use in extrusion of polymers in conjunction with a polymer extrusion screw in an extruder, wherein recesses are provided which are continuous grooves, cut on a helix in both the rotor outer diameter and the stator inner diameter, which create a pumping action in both the stator and rotor grooves, and the transfer of fluid from the rotor grooves to the stator grooves and back to the rotor grooves over a specific axial length occurs several times, producing the desired mixing action since the flow from one to the other is continuously being cut off by the rotation of the rotor.

Another object of the present invention is the provision of a fluid mixer as described in the immediately preceding paragraph wherein the grooves cut in the rotor outer diameter and the stator inner diameter change in depth with length on both the rotor and the stator but never disappear, and wherein the elements are not registered circumferentially but are arranged end to end in a random fashion so that a groove in one does not necessarily line up with a groove in the next one, thus allowing random mixing.

Yet another object of the present invention is the provision of a fluid mixer, intended primarily as a retrofit or add-on cavity-transfer type mixer assembly for use with extruder screws and like devices, to serve as a mixing head, wherein the helix angle of the grooves is less than 45° providing a groove pumping capacity which approximates that of an extruder screw metering section.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
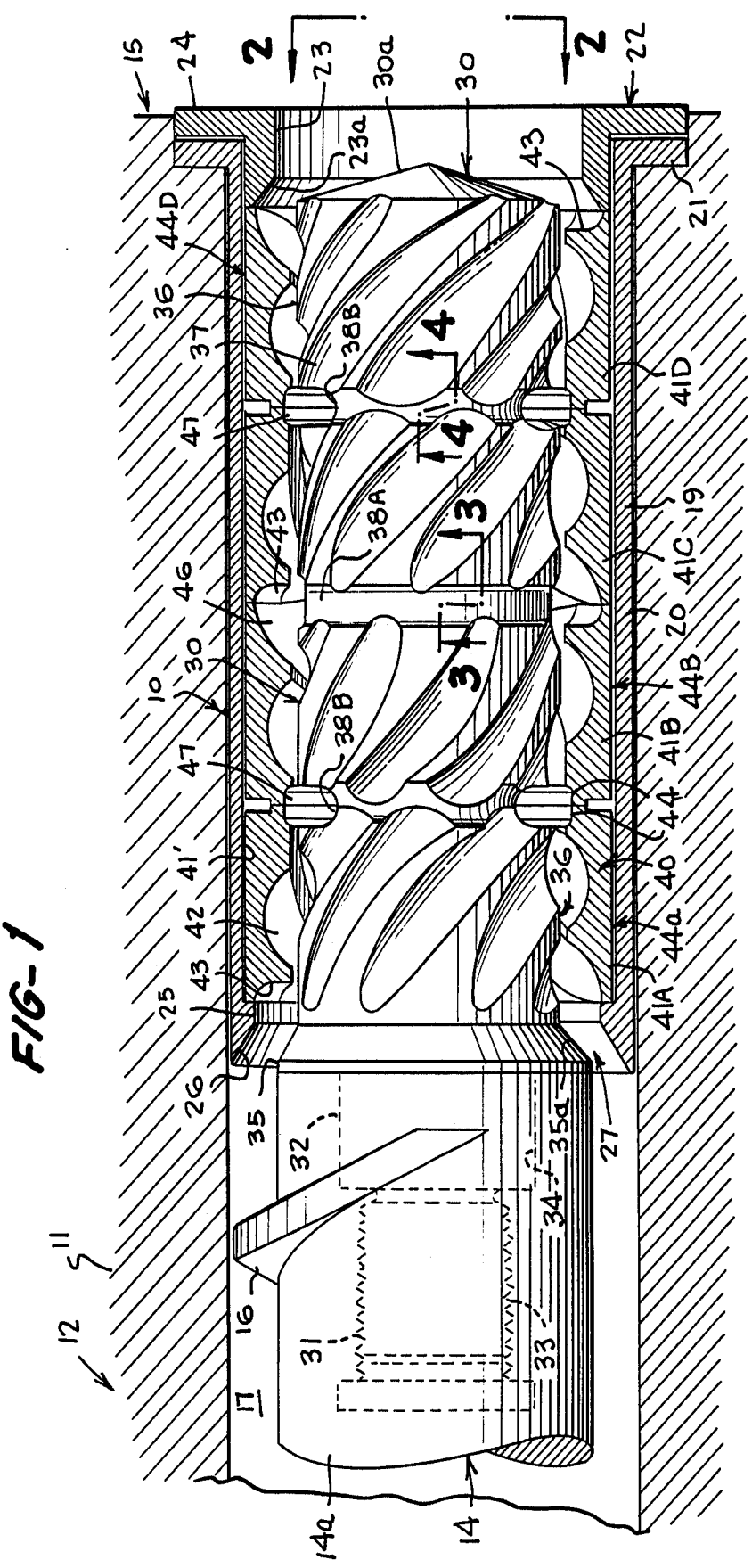
FIG. 1 is a somewhat diagrammatic side elevational view of the discharge end portion of the screw section of a conventional single extruder screw assembly and the transfer mixer assembly of the present invention connected to the outlet end of the extruder screw portion, with the barrel of the extruder and the stator concentric mixing elements of the assembly shown in section.
Figure 2:
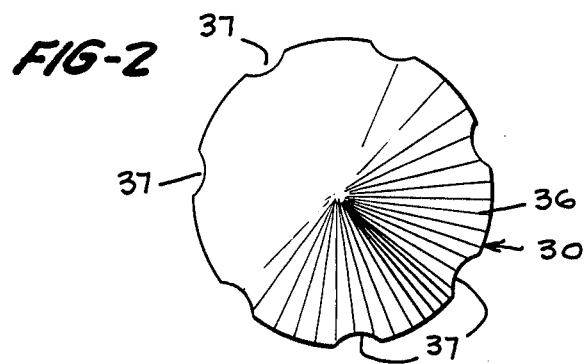
FIG. 2 is a discharge end view of the rotor portion of the transfer mixer assembly.
Figure 3:
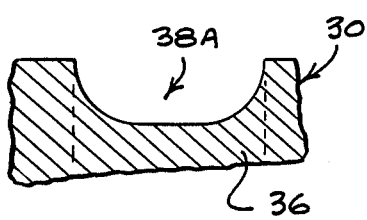
FIG. 3 is a fragmentary section view taken along the line 3—3 of FIG. 1, showing the detail, to enlarged scale, of the profile of the annular groove in the mid region of the rotor member.
Figure 4:
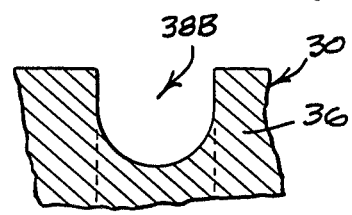
FIG. 4 is a fragmentary detailed section view, to enlarged scale, of the grooves between the mid region groove and the opposite ends of the rotor member, taken along the lines 4—4 of FIG. 1.
Figure 6:
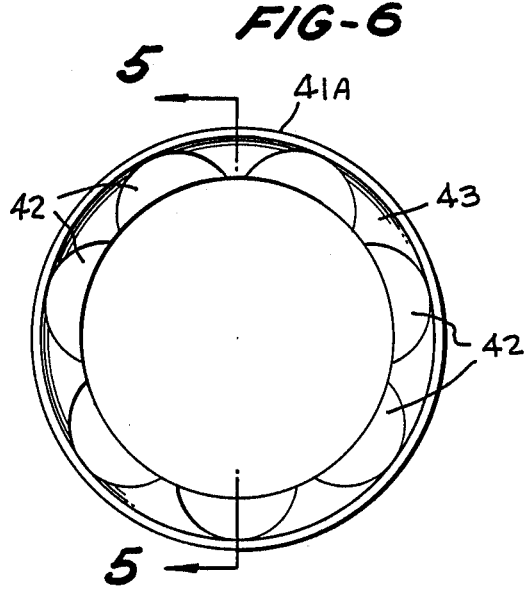
FIG. 6 is an inlet end view of the stator element shown in FIG. 5, viewed from the left of FIG. 5.

Referring to the drawings, wherein like referenced characters designate corresponding parts throughout the several figures, the transfer mixer assembly of the present invention is indicated generally by the reference character 10 and is adapted, in the preferred illustrated embodiment, to be retrofitted in the discharge end portion of the cylindrical barrel 11 of a conventional single screw extruder of conventional design, indicated generally by the reference character 12 which may be of any known type, for example of the type having a feed hopper at the inlet end through which the feed material is fed to the inlet end of the barrel 11 and is delivered along the length of the extruder screw 14, upon rotation of the screw, toward the discharge end 15 of the barrel. Plastic material or mixture of materials is fed by one or more helical threads 16 on the extruder screw 14, having a minimum clearance to the interior surface of the barrel 11, the thread 16 crating a helical channel 17 radially extending around the core 14a of the extruder screw. The number of turns of threads 16 around the core 14a will be hereinafter referred to as "turns" for brevity, and the axial distance between one turn of the thread 16 is called "pitch". Obviously, the extruder screw 14 may be of a more advanced construction, such as the extruder screw of the Chung U.S. Pat. No. 4,000,884, or the Barr Patent No. 3,858,856, or U.S. Pat. No. 4,405,239.

As is known in the art, a solid plastic material, or a mixture of materials, in pellet, chip, powder, or flake form is fed into the channel 17 by the feed hopper and travels down the channel 17 by forces created by rotation of the screw 14. The action of the screw threads 16 on the feed material is well known and has been described in a number of prior patents, including the patents identified above.

The transfer mixer assembly 10 of the present invention for achieving improvement in mixing of the material under low sheer conditions while still achieving pumping action in a forward direction of the material being forced through the barrel, is adapted to be retrofitted into the discharge end 15 of the barrel by a generally cylindrical tubular adapter sleeve member 19 having an elongated cylindrical body portion 20 and an outwardly projecting angular flange 21 at the outlet end thereof and an outlet adapter collar member 22 having a cylindrical tubular axially short body portion 23 and a radially extending annular flange portion 24. The outer diameter surface of the tubular cylindrical body portion 23 of the outlet adapter column member 22 is dimensioned to tightly interfit into and engage the confronting surface portions of the inwardly facing surface of the cylindrical body portion 20 of the adapter sleeve member 19, as shown, and has a bevelled or chamfered truncated conical surface 23a at the inlet end of the body portion 23 which converges inwardly toward the axis of the barrel and toward a point spaced downstream from the outlet end thereof. Adjacent the inlet or upstream end of the adapter sleeve 19 is an annular shoulder formation 25 facing towards the downstream end of the barrel to form an abutment or bearing shoulder for stator portions of the transfer mixer assembly 10, and upstream of the shoulder formation 25 the inlet end of the sleeve 19 is also provided with a bevelled or chamfered throat 26 lying in a truncated path concentric with the center axis of the barrel and joining a cylindrical inlet passage portion 27.

The transfer mixer assembly 10 includes a rotor member 30, having an upstream end portion, in the illustrated embodiment, provided with an externally threaded upstream end section 31 and an unthreaded larger diameter cylindrical portion 32 adapted to be assembled into a similarly internally threaded socket 33 and larger diameter socket portion 34 in the discharge end of the extruder screw 14, to permit the rotor member 30 to be assembled and disassembled from the extruder screw by conventional screw threading techniques. The upstream end portion of the rotor member 30 also includes a larger diameter stop shoulder formation 35 having a bevelled or chamfered truncated conical surface portion 35a confronting and co-acting with the bevelled or chamfered surface portion 26 of the adapter sleeve 19 to define an annular inlet passage surrounding the discharge end of the extruder screw 14 into the outlet portion of the barrel in which the transfer mixer assembly is positioned.

The active portion of the rotor 30 extending from the smaller diameter end of the bevelled portion 35a (shown in FIG. 1) to the downstream end portion 30a is a generally cylindrical rotor body 36 having in the surface thereof a plurality of helical groove portions 37 and also subdivided longitudinally into a plurality of axially spaced sections, four sections being shown in the illustrated embodiment, by transverse annular grooves 38A at the longitudinal mid region and 38B between groove 38A and the opposite ends of the rotor.

Figure 5:
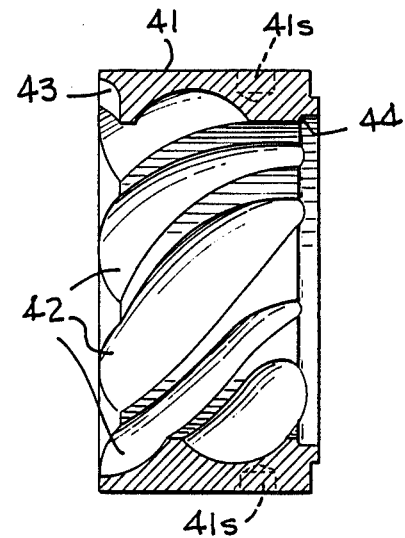
FIG. 5 is a section view, taken along the vertical mid plane at line 5—5 of FIG. 6, of one of the stator elements of the transfer mixer assembly.
Figure 7:
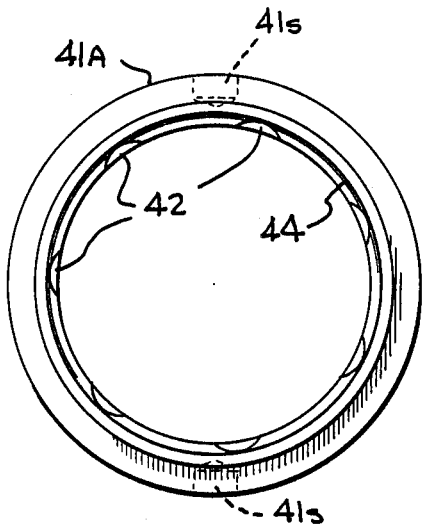
FIG. 7 is an outlet end view of the stator element, taken from the right of FIG. 5.
Figure 8:
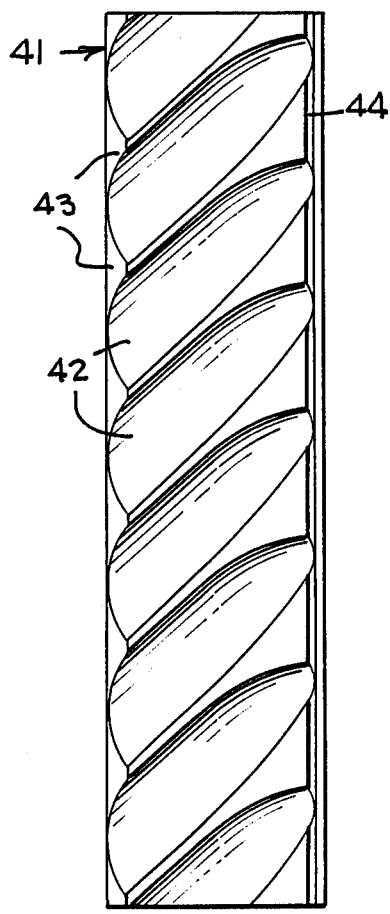
FIG. 8 is an unwrapped internal view of the helical grooved inwardly facing surface of the stator element of FIG. 5.

Similarly, the stator component 40, which in the illustrated embodiment is formed of a plurality of axially spaced annular stator elements 41A to 41D are stacked in end-to-end abutment in a stacked array within the adapter sleeve 19, with the forwardmost stator element 41A abutting the shoulder formation 25 of the adapter sleeve 19, four being shown in the illustrated embodiment. These stator elements 41A to 41D are identical to one another, but are installed with every other stator element turned backward relative to the previous one, as will be apparent from inspection of FIGS. 1 and 5. The array of stator elements 41A–41D are secured in position axially by the outlet adapter collar member 22 and include diametrically opposite sockets 41s (shown in FIGS. 5 and 7) for fixation pins or set screws (not shown) to fix them in position circumferentially. The stator elements are held against rotation about their axial center line (the extended center line of the extruder screw 14) by the fixation pins or set screws, which extend radially through the sleeve 19. There can be two pins for each stator element, arranged 180 apart, to fit into the diametrically opposite sockets 41s shown in FIGS. 5 and 7. The stator elements 41 have an outer cylindrical surface 41' corresponding substantially to the inner diameter of the bore in the elongated tubular cylindrical body portion 20 of the adapter sleeve member 19 and have a plurality of helical grooves 42 formed in the inwardly facing surface thereof together with concave fillet surfaces 43 extending entirely around the axis of the stator element at one end thereof of a first chosen diameter and concave fillet surfaces 44 at the opposite end thereof of a smaller diameter.

In the illustrated embodiment, the same number of grooves are provided throughout the mixer, that is the same number of grooves are provided on both the rotor member 30 and the stator component assembly 40. At the inlet to the mixer section, the rotor grooves 37 start at a minimum depth and increase to a maximum depth at the end of the first mixing section 44A which spans the axial extent of the first stator element 41A. Conversely, the stator helical grooves 42 in the first section stator element 41A start at the maximum depth at the inlet to the mixer and decrease to a minimum at the end of the first section 44A. Similarly, the helical grooves 37 in the second section 44B of the rotor 36 start at maximum depth at the upstream end of the second mixing section and decrease to a minimum depth at the end of that second mixing section, and the helical grooves 37 of the rotor body 36 in the third and fourth mixing sections 44C and 44D change in depth in a similar manner to those in the sections 44A and 44B respectively. Likewise, the helical grooves 42 in the stator element 41B of the second mixer section 44B start at a minimum depth at the upstream end and increase to a maximum depth at the downstream end, and the helical grooves 42 in the stator elements 41C and 41D change in the same manner as the helical grooves in the stator elements 41A and 41B.

The reason, for providing a plurality of mixing sections as described above and producing the stator elements 41 as separate elements is to keep the cost of the mixer as low as possible. It is very difficult to machine deep internal helical grooves in the stator over a length much more than one to two times its inside diameter. While each stator element is identical but assembled opposite to the next, they are short and thus easy to machine and are identical to each other for lowest possible cost. In addition, the stator elements are not registered circumferentially, but are assembled end to end in a random fashion so that a helical groove 42 in one does not necessarily line up with the helical groove 42 in the next one of the stator elements 41. This allows random mixing.

Figure 9:
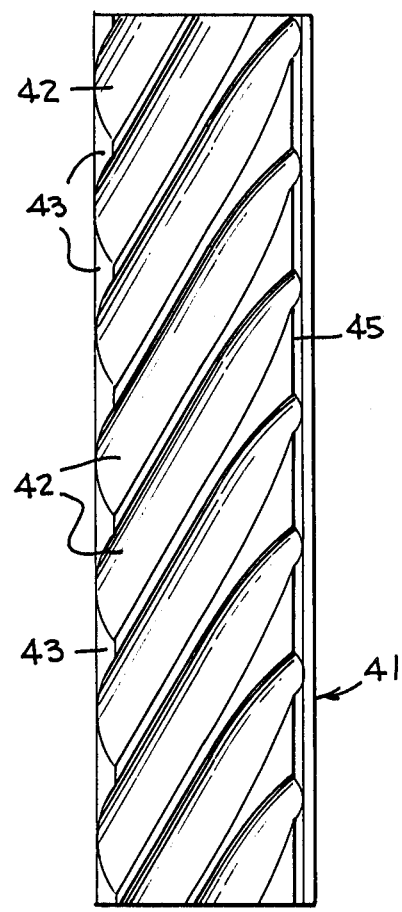
FIG. 9 is an unwrapped internal view of a stator element similar to FIG. 8, but wherein the pitch of the grooves is different from that of FIG. 8.

It is important to note that the recesses or helical grooves 37 and 42 of the rotor body 36 and stator elements 41 are continuous grooves, cut on a helix in both the rotor outer diameter and the stator inner diameter. They do change in depth with axial length on both the rotor and the stator but never disappear. These helical grooves create a pumping action in both the stator and rotor grooves. These helical grooves 42 and the stator 40 have a reverse helix to the helical grooves 37 on the rotor 30 so that both create a pumping action. The helix angle of the grooves in both the stator and the rotor is less than 45°, in order to insure a groove pumping capacity near that of a screw metering section. For example, the helix angle of the grooves may be about 30°. The helix angle of the grooves is measured between the axial center line of the screw 14 and the center line of the groove 37 or 42. As seen in FIG. 9, the axial center line would be a horizontal center line, and the center line of the grooves are the phantom dot-dash lines extending along the centers of the grooves. The helix angle of the element grooves 42 is of opposite hand to the helix angle of the rotor grooves 37. The rotor grooves 37 shown in FIG. 1 have the same "hand" as the screws flight 16 of the extruder screw 14 running from top left to bottom right. The grooves in the stator elements 41 are opposite to this as shown in FIG. 9, where they run form bottom left to top right. The helical grooves 37 and 42, from one section to another of the mixing sections 44A-44D are continuous in helix angle, and on the rotor 30 their center lines coincide. They never reach zero depth, but do come to a minimum depth of about 1/6th of the maximum depth.

Also, the concave fillet surfaces 43 and 44 form circumferential grooves 46 and 47 lying in a plane perpendicular to the axis of the rotor that interrupts the helical grooves 37, 42 on both the rotor 30 and stator 40. The depth of the circumferential grooves 46 and 47 is the same as the helical grooves 37 and 42 that empty into it on both the rotor and the stator. The purpose of these circumferential grooves 46, 47 is to allow further disruption and cross mixing between the sections. Therefore the polymer can move from one groove helix to another in these circumferential grooves 46, 47 and thus is not confined to any one helical groove throughout the mixer.

The transfer of fluid from the rotor helical grooves 37 to the stator helical grooves 42 and back to the rotor grooves 37 over a specific axial length several times, produces the mixing action, since the flow from one to the other is continuously being "cut off" by the rotation of the rotor 30. Thus the device effects "slicing" of thin layers of fluid as it flows from rotor to stator or vice versa.

In the disclosed construction, the depth of the helical grooves 37 and 42 is altered with length such that the transfer from the rotor helical grooves 37 to the stator helical grooves 42 would be forced by the groove depth change. As the depth of the rotor grooves 37 decreases with length, the depth of the stator grooves 42 increases. This depth change from maximum to minimum takes place several times in the length of the mixer. By this design, a pumping action is obtained from the helix angle, insuring complete transfer from rotor to stator and back several times, and obtaining the "cutting" action of the flights on the rotor chopping across the stator grooves. The cross sectional area of the total rotor groove area plus the total stator groove area at any point in the mixer remains constant, insuring pulse free pumping.

As one specific example, the rotor grooves 37 may be formed with a 7½ inch pitch cut with a 0.7133 inch diameter ball end mill to a profile maximum depth of about 0.375 inch and a minimum depth of about 0.0625 inch, and the grooves 42 in the stator elements 41 may be formed with a 7½ inch pitch with a 0.7113 inch diameter ball end mill. Alternatively, the rotor and stator grooves may be cut or on a 4½ inch pitch with a 0.4974 inch diameter ball end mill, the unwrapped interval view of such a 4½ inch pitch stator being shown in FIG. 9.

While the transfer mixer assembly of the present invention has been specifically described in connection with a conventional single screw extruder, it will be appreciated that it can also be used in conjunction with other extruder screws as a retrofit assembly in a portion of the barrel for the extruder screw, or it may be mounted in a separate barrel portion, for example as an extended adapter to an existing extruder barrel, it can be used for any fluid, and may be used without an extruder as a separately driven device, as for example as a mixer in a chemical pipe line or the like.

I claim:

1. An extruder mixer assembly for use with a screw-type polymer extruder including a barrel defining an elongated cylindrical bore having inlet and outlet ends and a driven screw rotatable in the barrel about a longitudinal center axis of the bore, the screw having a feed end and a discharge end and comprising at least one helical thread having plural turns creating a helical channel in the space between successive turns of the thread and having a minimum clearance to the surface of the bore to feed plastic or fluid material along the screw to said discharge end; said mixer assembly having means for mixing and pumping toward said outlet end said material fed thereto from the discharge end of said screw comprising a stator assembly fixed within said barrel adjacent said outlet end having outer cylindrical surface portions fitted within and conforming substantially to the surface of said cylindrical bore and supported against rotation in the bore and having a stator bore provided with a radially inwardly facing groove-interrupted contoured material working first surface, a rotor member driven from the discharge end of said screw having a groove-interrupted outwardly facing material working contoured second surface confronting said first surface rotatable within said stator bore, said first and second surfaces being of generally cylindrical configuration each having continuous helical grooves cut therein along a helical path which changes in depth with length from a small minimum depth to a larger maximum depth but never disappearing and having a plurality of axially spaced circumferential grooves encircling the associated surface along respective planes perpendicular to said center axis subdividing said first and second surfaces into axially spaced serially arranged mixer sections with portions of said helical grooves extending between the circumferential grooves defining each section, the helical grooves being disposed at a helix angle of less than 45° to provide groove pumping of the material toward said outlet end and producing transfer of the material from the rotor member grooves to the stator assembly grooves and back to the rotor member grooves several times during progression of the material along the length of the mixer assembly.

2. An extruder mixer assembly as defined in claim 1, wherein said helical grooves in said first surfaces of said stator assembly in the respective mixer sections are arranged circumferentially in random fashion such that the grooves in one mixer section stator portion first surface do not necessarily line up with the grooves in the next adjacent mixer section stator portion to allow random mixing.

3. An extruder mixer assembly as defined in claim 2, wherein said circumferential grooves of the stator and rotor first and second surfaces include a circumferential concave groove located substantially midway along the axial length of the rotor and a pair of additional circumferential concave grooves located substantially midway between the first-mentioned concave groove and opposite upstream and down-stream ends of the rotor.

4. An extruder mixer assembly as defined in claim 3, wherein the helical grooves in said first surfaces of said stator assembly have a reverse helix to the helical grooves in said second surfaces of said rotor member whereby both create a pumping action.

5. An extruder mixer assembly as defined in claim 3, wherein the depth of said circumferential grooves is the same as the helical grooves that empty into them on both the stator and rotor first and second surfaces.

6. An extruder mixer assembly as defined in claim 2, wherein the helical grooves in said first surfaces of said stator assembly have a reverse helix to the helical grooves in said second surfaces of said rotor member whereby both create a pumping action.

7. An extruder mixer assembly as defined in claim 6, wherein the depth of said circumferential grooves is the same as the helical grooves that empty into them on both the stator and rotor first and second surfaces.

8. An extruder mixer assembly as defined in claim 6, wherein said stator assembly is formed of a plurality of axially spaced annular stator elements coextensive with said mixer sections, respectively, arranged in end-to-end abutment in stacked array, each of the stator elements being secured in axial position and in circuferential angular position with the inner diameter surface thereof forming with adjacent like stator elements said first surfaces having said helical grooves and said circumferential grooves therein.

9. An extruder mixer assembly as defined in claim 2, wherein the depth of said circumferential grooves is the same as the helical grooves that empty into them on both the stator and rotor first and second surfaces.

10. An extruder mixer assembly as defined in claim 9, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

11. An extruder mixer assembly as defined in claim 2, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

12. An extruder mixer assembly as defined in claim 1, wherein said circumferential grooves of the stator and rotor first and second surfaces include a circumferential concave groove located substantially midway along the axial length of the rotor and a pair of additional circumferential concave grooves located substantially midway between the first mentioned concave groove and opposite upstream and down-stream ends of the rotor.

13. An extruder mixer assembly as defined in claim 12, wherein the helical grooves in said first surfaces of said stator assembly have a reverse helix to the helical grooves in said second surfaces of said rotor member whereby both create a pumping action.

14. An extruder mixer assembly as defined in claim 1, wherein the helical grooves in said first surfaces of said stator assembly have a reverse helix to the helical grooves in said second surfaces of said rotor member whereby both create a pumping action.

15. An extruder mixer assembly as defined in claim 14, wherein the depth of said circumferential grooves is the same as the helical grooves that empty into them on both the stator and rotor first and second surfaces.

16. An extruder mixer assembly as defined in claim 14, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

17. An extruder mixer assembly as defined in claim 1, wherein the depth of said circumferential grooves is the same as the helical grooves that empty into them on both the stator and rotor first and second surfaces.

18. An extruder mixer assembly as defined in claim 17, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

19. An extruder mixer assembly as defined in claim 1, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

20. A mixer assembly for mixing fluid in an elongated bore of a barrel formation through which the fluid is fed comprising a housing having a barrel portion defining an elongated cylindrical bore having inlet and outlet ends and a rectilinear longitudinal center axis for feeding of plastic or fluid material to said outlet end; said mixer assembly having means for mixing and pumping toward said outlet end said material fed to said inlet end comprising a stator assembly fixed within said barrel portion adjacent said outlet end having outer cylindrical surface portions fitted within and conforming substantially to the surface of said cylindrical bore and supported against rotation in the bore and having a stator bore provided with a radially inwardly facing groove-interrupted contoured material working first surface, a driven rotor member having a groove-interrupted outwardly facing material working contoured second surface confronting said first surface rotatable within said stator bore, said first and second surfaces being of generally cylindrical configuration each having continuous helical grooves cut therein along a helical path which changes in depth with length from a small minimum depth to a larger maximum depth but never disappearing and having a plurality of axially spaced circumferential grooves encircling the associated surface along respective planes perpendicular to said center axis subdividing said first and second surfaces into axially spaced serially arranged mixer sections with portions of said helical grooves extending between the circumferential grooves defining each section, the helical grooves being disposed at a helix angle of less than 45° to provide groove pumping of the material toward said outlet end and producing transfer of the material from the rotor member grooves to the stator assembly grooves and back to the rotor member grooves several times during progression of the material along the length of the mixer assembly.

21. An extruder mixer assembly as defined in claim 20, wherein said helical grooves in said first surfaces of said stator assembly in the respective mixer sections are arranged circumferentially in random fashion such that the grooves in one mixer section stator portion first surface do not necessarily line up with the grooves in the next adjacent mixer section stator portion to allow random mixing.

22. An extruder mixer assembly as defined in claim 21, wherein said circumferential grooves of the stator and rotor first and second surfaces include a circumferential concave groove located substantially midway along the axial length of the rotor and a pair of additional circumferential concave grooves located substantially midway between the first-mentioned concave groove and opposite upstream and down-stream ends of the rotor.

23. An extruder mixer assembly as defined in claim 22, wherein the helical grooves in said first surfaces of said stator assembly have a reverse helix to the helical grooves in said second surfaces of said rotor member whereby both create a pumping action.

24. An extruder mixer assembly as defined in claim 22, wherein the depth of said circumferential grooves is the same as the helical grooves that empty into them on both the stator and rotor first and second surfaces.

25. An extruder mixer assembly as defined in claim 22, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumferential grooves therein.

26. An extruder mixer assembly as defined in claim 21, wherein the helical grooves in said first surfaces of said stator assembly have a reverse helix to the helical grooves in said second surfaces of said rotor member whereby both create a pumping action.

27. An extruder mixer assembly as defined in claim 20, wherein said circumferential grooves of the stator and rotor first and second surfaces include a circumferential concave groove located substantially midway along the axial length of the rotor and a pair of additional circumferential concave grooves located substantially midway between the first-mentioned concave groove and opposite upstream and down-stream ends of the rotor.

28. An extruder mixer assembly as defined in claim 27, wherein the helical grooves in said first surfaces of said stator assembly have a reverse helix to the helical grooves in said second surfaces of said rotor member whereby both create a pumping action.

29. An extruder mixer assembly as defined in claim 20, wherein the helical grooves in said first surfaces of said stator assembly have a reverse helix to the helical grooves in said second surfaces of said rotor member whereby both create a pumping action.

30. An extruder mixer assembly as defined in claim 20, wherein said stator assembly is formed of a plurality of axially spaced annular stator elements coextensive with said mixer sections, respectively, arranged in end-to-end abutment in stacked array, each of the stator elements being secured in axial position and in circumferential angular position with the inner diameter surface thereof forming with adjacent like stator elements said first surfaces having said helical grooves and said circumfrrential grooves therein.

* * * * *